US 6,748,121 B2

(12) United States Patent
Kim et al.

(10) Patent No.: US 6,748,121 B2
(45) Date of Patent: Jun. 8, 2004

(54) INTELLIGENT INTERPOLATION METHODS FOR AUTOMATIC GENERATION OF AN ACCURATE DIGITAL ELEVATION MODEL

(75) Inventors: Seung Bum Kim, Taejon (KR); Tag Gon Kim, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 631 days.

(21) Appl. No.: 09/736,265

(22) Filed: Dec. 15, 2000

(65) Prior Publication Data

US 2002/0035553 A1 Mar. 21, 2002

(30) Foreign Application Priority Data

Jul. 20, 2000 (KR) ........................................ 2000-41649

(51) Int. Cl.[7] .............................. H04N 7/18; H04N 9/47; G06F 19/00; G06K 9/32; G06K 9/54
(52) U.S. Cl. ...................... 382/300; 348/140; 348/144; 348/135; 702/5; 382/154; 382/288; 382/109
(58) Field of Search .................................. 382/106, 108, 382/109, 113, 154, 288, 300; 356/112; 359/462; 434/130; 702/2, 5; 73/784; 405/258.1; 348/135, 140, 26, 144

(56) References Cited

U.S. PATENT DOCUMENTS

| 5,596,494 | A | * | 1/1997 | Kuo ............................... 702/2 |
| 5,612,901 | A | * | 3/1997 | Gallegos et al. ............... 702/3 |
| 5,926,581 | A | * | 7/1999 | Pritt ............................. 382/294 |
| 5,974,170 | A | * | 10/1999 | Louis et al. ................. 382/154 |

* cited by examiner

Primary Examiner—Amelia M. Au
Assistant Examiner—Wesley Tucker
(74) Attorney, Agent, or Firm—Bacon & Thomas, PLLC

(57) ABSTRACT

The present invention relates generally to interpolation methods for automatic generation of an accurate digital elevation model, and more particularly relates to intelligent interpolation methods for accurate extraction of 3-dimensional digital elevation models from satellite images, aerial photographs, or land surveying. The present invention is composed of three basic processes: The first process (102) of COG/ECI elimination, the second process (104) of hole-fill segmentation, and the third process (103) of noise-remove segmentation. The invention produces an accurate digital elevation model even for the areas with open boundaries such as the sea off the coast and over a river.

6 Claims, 5 Drawing Sheets

US 6,748,121 B2

INTELLIGENT INTERPOLATION METHODS FOR AUTOMATIC GENERATION OF AN ACCURATE DIGITAL ELEVATION MODEL

BACKGROUND OF THE INVENTION

1. Field of the Invention

The present invention relates generally to interpolation methods for automatic generation of an accurate digital elevation model, and more particularly relates to intelligent interpolation methods for accurate extraction of 3-dimentional digital elevation models from satellite images, aerial photographs, or ground surveying.

2. Description of the Related Art

Digital elevation model (DEM) is the topographic data composed of the set of horizontal coordinates (x, y) and its elevation (z) for each grid cell in a given region. The process of DEM can be summarized in three steps; (1) image-matching step to find overlapped regions from stereo images, (2) camera-modeling step to obtain (x,y,z) from the results of the image-match with a camera model relating the photo plane with the absolute ground coordinates, and (3) interpolation step to change the uneven horizontal distribution resulted from camera-model into the uniform horizontal square distribution. In ground surveying, image-match and camera-model could be omitted.

Interpolation is essential for an automatically generated DEM. For a manually generated DEM, interpolation is necessary, but the effect of interpolation is insignificant. Many studies on interpolation have progressed since 1970's, and focused on finding the optimal interpolation method from dozens of mathematical model such as Gaussian, Kriging, Nearest Neighbor, Moving Window Average, Multiquadric, Modified Shepard, Spline, and Minimum Curvature. We call these old methods as conventional interpolation methods (CIMs).

Since the CIMs handle less than a few hundreds of input data as an experimental trial, following problems show up when the CIMs are applied to the results of the real data; artificial lands are created with the size of the interpolation radius near coast, breakwater, lake, and river. An intellectual interpolation method is introduced to deal with the real data (Krupnik, A., 1998, Automatic detection of erroneous areas in automatic surface reconstruction, Proceedings of ISPRS Commission III Symposium, Columbus, Ohio, p. 132–137). In this method, the edges of a lake or farmland are matched, and the interpolation is performed on the matching results. However, this method can not be applied to the areas with open boundaries such as the sea off the coast and a river.

SUMMARY OF THE INVENTION

It is an object of the present invention to provide intelligent interpolation methods for automatic generation of an accurate digital elevation model, which can solve the above-mentioned problems near a coast or a river.

The present invention is composed of three basic processes: The first process (102) of Center-of-Gravity(COG)/ Empty-Center-Index(ECI) elimination, which eliminates the artificial elevation off the edge of the stereo-matched region, generated by the result (101) of the conventional interpolation methods if the corresponding COG or ECI is greater than a threshold. The second process (104) of hole-fill segmentation, which segments the eliminated region after the first process (102), and decides whether the eliminated elevation should be reconstructed based upon the size of the segment. And the third process (103) of noise-remove segmentation, which segments the interpolated region after the first process (102), and decides whether the interpolated elevation should be eliminated based upon the size of the segment.

The invention produces an accurate digital elevation model even for the areas with open boundaries off the coast and over a river.

BRIEF DESCRIPTION OF THE DRAWINGS

Exemplary embodiments of the present invention will be described in conjunction with the drawings in which.

| 102 | first process   | 103 | third process |
| 104 | second process  | 418 | (a) step      |
| 419 | (b) step        | 420 | (c) step      |
| 517 | (A) step        | 511 | (B) step      |
| 512 | (C) step        |     |               |

DETAILED DESCRIPTION OF THE EMBODIMENTS

The present invention will be better understood with regard to the following description, appended claims, and accompanying figures. The present invention is composed of three basic processes: In the first process (102) of COG/ECI elimination, the artificial elevation from the result (101) of the conventional interpolation methods is eliminated if the corresponding COG or ECI is greater than a threshold. In the second process (104) of hole-fill segmentation, the eliminated region after the first process (102) is segmented, and it is decided whether the eliminated elevation should be reconstructed based upon the size of the segment. And in the third process (103) of noise-remove segmentation, the interpolated region after the first process (102) is segmented, and it is decided whether the interpolated elevation should be eliminated based upon the size of the segment.

Figure 1:
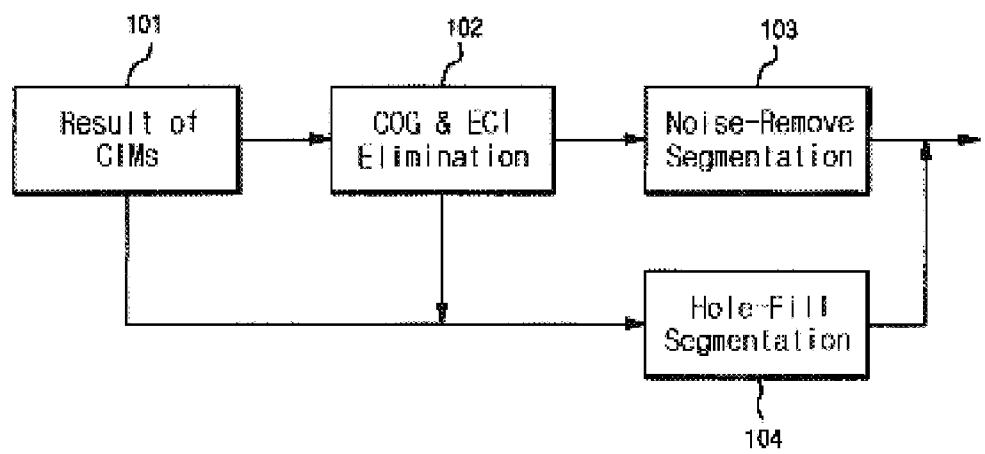
FIG. 1 is an overall block diagram of the intelligent interpolation methods of the present invention.
Figure 2:
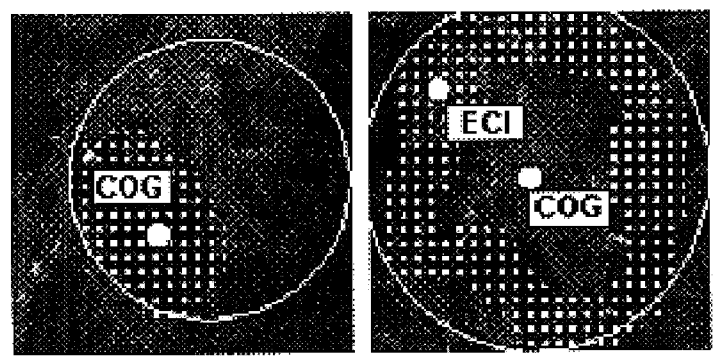
FIG. 2 represents definitions of Center-of-Gravity (COG) and Empty-Center-Index (ECI) of the present invention.

As mentioned earlier, when the CIMs are used, artificial lands are created with the size of the interpolation radius near the edge of the matched region. In order to remove these unwanted artifacts, the present invention utilizes COG/ ECI elimination scheme. Since artificial lands show up due to the concentration of the interpolants near the edge of the interpolation disc, the artificial elevation is removed using COG criterion; the interpolated elevation is eliminated if the corresponding COG is greater than a threshold. However, when the interpolants are distributed evenly in all directions as shown in the right of FIG. 2, the corresponding COG is close to zero, and the COG criterion can not eliminate the false elevation even though the interpolants concentrate near the edge of the interpolation region. In this case, noting the emptiness of the center of the interpolation disc, we use ECI elimination. In ECI elimination, the interpolated elevation is removed if the corresponding ECI is greater than an effective threshold.

The COG in FIG. 2 is defined as:

$$COG = \frac{\sqrt{(\Delta x)^2 + (\Delta y)^2}}{\text{max-dist}} \quad \text{(EQUATION 1)}$$

$$\overline{\Delta x} = \frac{\sum_{k=1}^{N}(x_k - x_o) \cdot w_{eqCOG}(x_k - x_o)}{\sum_{k=1}^{N} w_{eqCOG}(x_k - x_o)} \text{ and,}$$

similarly for $\overline{\Delta y}$.

Here $x_o$ and $y_o$ are horizontal coordinates of the center of the interpolation disc, max-dist is the maximum of the distance between $(x_o, y_o)$ and one of the interpolants, and $w_{eqCOG}(x_k-x_o)$ is a weighting factor to make the distribution of interpolants with respect to $(x_k-x_o)$ become a constant function, and this process is called 'equalization'.

Figure 3:
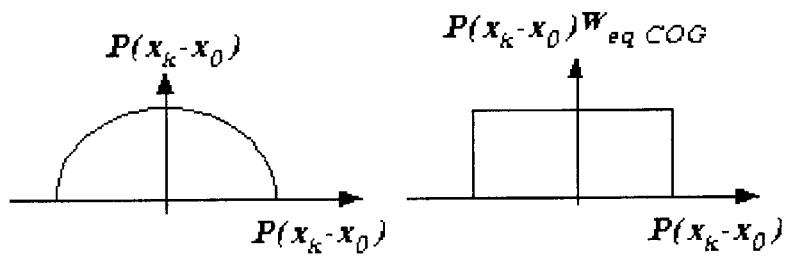
FIG. 3 shows the number of interpolants as a function of the distance from the center of the interpolation and the figure is referenced in Center-of-Gravity calculation of the present invention.

This weighting factor in FIG. 3 is defined as:

$$w_{eqCOG}(x_k - x_o) = \frac{\cos(0) + \delta_{\text{anti-sigu}}}{\cos\left(\left(\frac{\pi}{2}\right) \cdot \frac{x_k - x_o}{\text{max-dist}}\right) + \delta_{\text{anti-sigu}}} \quad \text{(EQUATION 2)}$$

Here $\delta_{anti-sigu}$ is a constant to prevent $w_{eqCOG}$ from reaching singularity.

FIG. 3 shows the number of interpolants as a function of the distance from the center of the interpolation when the interpolation disc is filled with interpolants; left shows the number of interpolants before the equalization, and right shows after.

Figure 4:
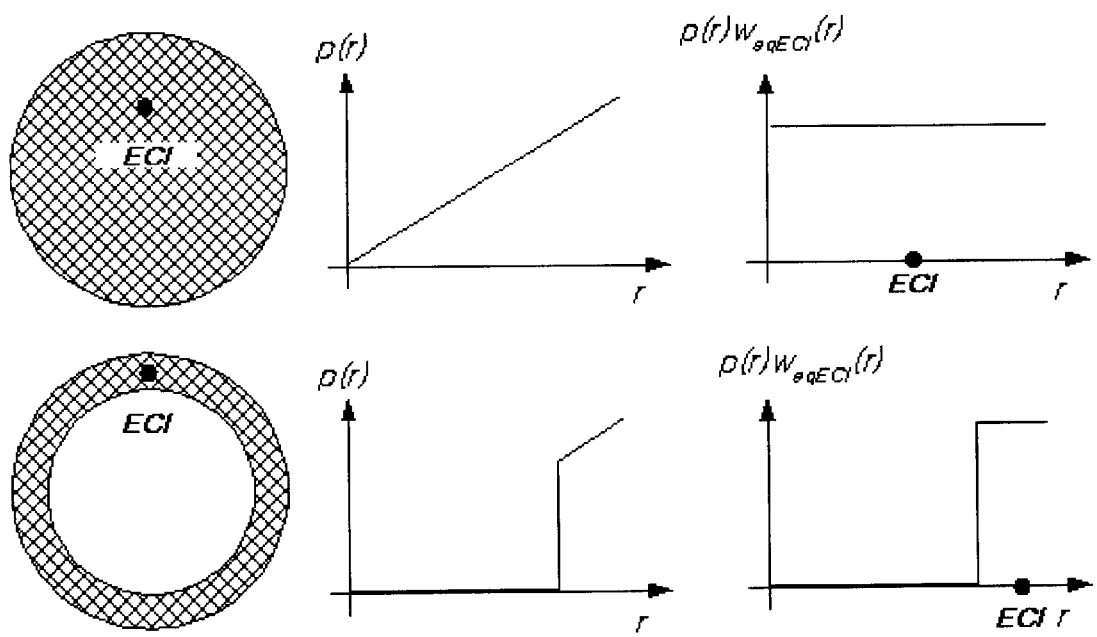
FIG. 4 shows the number of interpolants as a function of the distance from the center of the interpolation and the figure is referenced in Empty-Center-Index calculation of the present invention.

The ECI in FIG. 2 and FIG. 4 is defined as:

$$ECI = \frac{1}{\text{max-dist}} \cdot \frac{\sum_{k=1}^{N} r_k w_{eqECI}(r_k)}{\sum_{k=1}^{N} w_{eqECI}(r_k)} \quad \text{(EQUATION 3)}$$

Here $r_k$ is the distance between $(x_o, y_o)$ and an interpolant, and $w_{eqECI}$ is a weighting factor to equalize the distribution of interpolants with respect to $r_k$.

This weighting factor in FIG. 4 is defined as:

$$r_k = \sqrt{(x_k - x_o)^2 + (y_k - y_o)^2} + \Delta r_{unit}. \quad \text{(EQAUTION 4)}$$
$$w_{eq}(rk) = \Delta s^{-1} = [8\pi r_k \Delta r]^{-1}, s = 4\pi r_k^2$$

Here unit grid size $\Delta r_{unit}$ is a constant to prevent $w_{eq}$ from reaching singularity.

FIG. 4 shows the number of interpolants as a function of the distance from the center of the interpolation where the interpolants are located in the hatched area; center column shows the number of interpolants before the equalization, and right column shows after.

After the first process (102) where the interpolated elevation is removed with the COG and ECI criteria, the second process (104) of hole-fill segmentation scheme and the third process (103) of noise-remove segmentation scheme are performed. The hole-fill segmentation scheme counterbalances the COG and ECI elimination; it recovers healthy inland elevations inevitably removed by COG/ECI elimination. The noise-remove segmentation scheme complements the COG/ECI elimination; it removes the unwanted noise-like elevation over the sea arising from imperfect performance of the COG/ECI elimination.

In the second process (104) of the hole-fill segmentation scheme, segment the eliminated region resulting from the first process (102) of the COG/ECI elimination, and decide whether the eliminated elevation should be reconstructed based upon the size of the segment.

Figure 6:
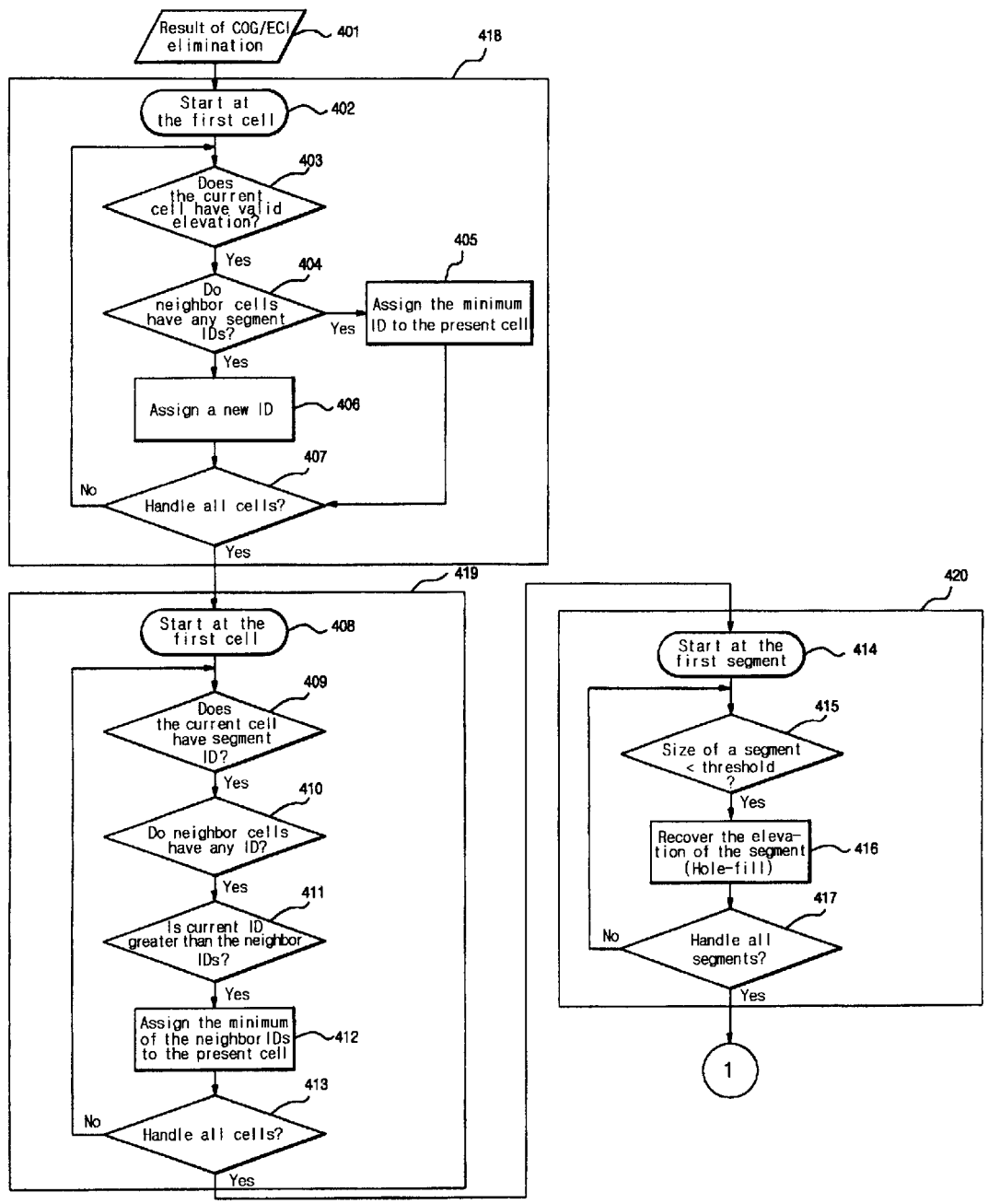
FIG. 6 is a flow chart for the hole-fill segmentation scheme of the present invention.

In the (a) step (418) of the second process (see FIG. 6), start at the first one (402) of the cell eliminated by the COG/ECI elimination and when the current grid cell does not have valid elevation, search neighboring grid cells with no valid elevation (403). Here 4-connectivity or 8-conectivity scheme is used to search neighboring grid cells. See (404) if the neighboring empty cells have segment identification numbers (ID). Assign (405) the minimum value of the segment IDs to the present cell. It is not necessary to choose the minimum, and it is possible to choose a maximum as long as application of maximum is made consistently over the whole image. If no neighbor cells have an ID, assign a new ID—the largest ID so far plus one (406). Repeat the above processes from the top-left to the bottom-right and complete one scan (407).

In the (b) step (419) of the second process, merge fragmented segments: The merging is performed by repeating (408–410) of the (a) step (418) except differences in a scan direction and in a rule for assigning a segment ID. Scan directions are from the remaining three corners of the scene. And assign (412) the minimum value of all neighboring IDs to the present cell when the ID of the present cell is greater than the neighboring IDs (411). This merging in the (b) step (419) is necessary because just one scan makes one empty area fragmented into several small segments.

In the (c) step (420) of the second process, recover (416) the removed elevation of a segment if the size of a merged segment is smaller than a threshold (415). A user chooses the value of the threshold experimentally.

In the (a) step (418) of the second process, 4-connectivity scheme dictates the the cells are connected with the sides of the cell, while the sides and corners are used for 8-connectivity scheme. When 4-connectivity is used during the search of IDs in the neighbor cells, more fragments are generated compared to the 8-connectivity case. However, no difference exists between 4-connectivity and 8-connectivity search scheme after the merging of fragments by the scans in the four directions.

Figure 5:
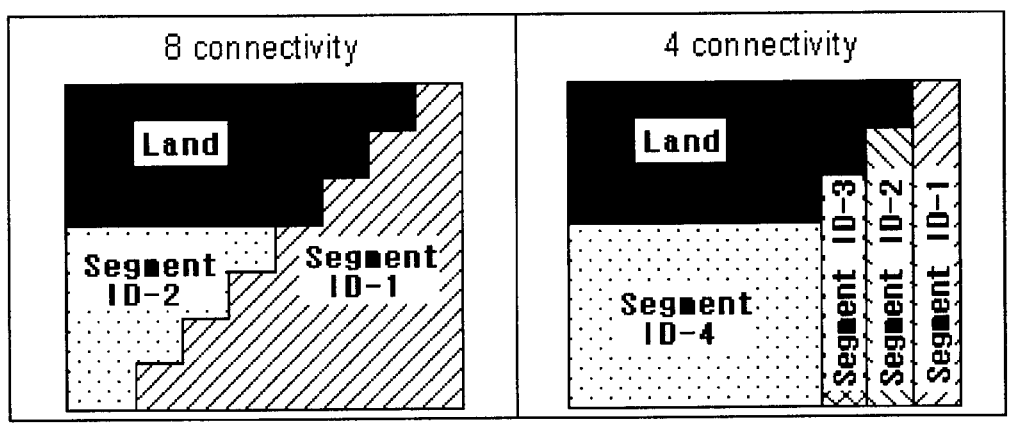
FIG. 5 exemplifies fragmentation during segmentation of the present invention.

Segmentation mentioned in the (b) step (419) is shown schematically in FIG. 5. However, it has the following problem: Even though some region should remain as a hole with no elevation, the unwanted elevation is recovered in the (c) step (420) since some region becomes smaller than the threshold of the (c) step (420) due to the segmentation.

In the third process (103) of the noise-remove segmentation scheme, segment the interpolated region after the first process (102) of COG/ECI elimination, and decide whether the segment should be removed based upon the size of the segment.

Figure 7:
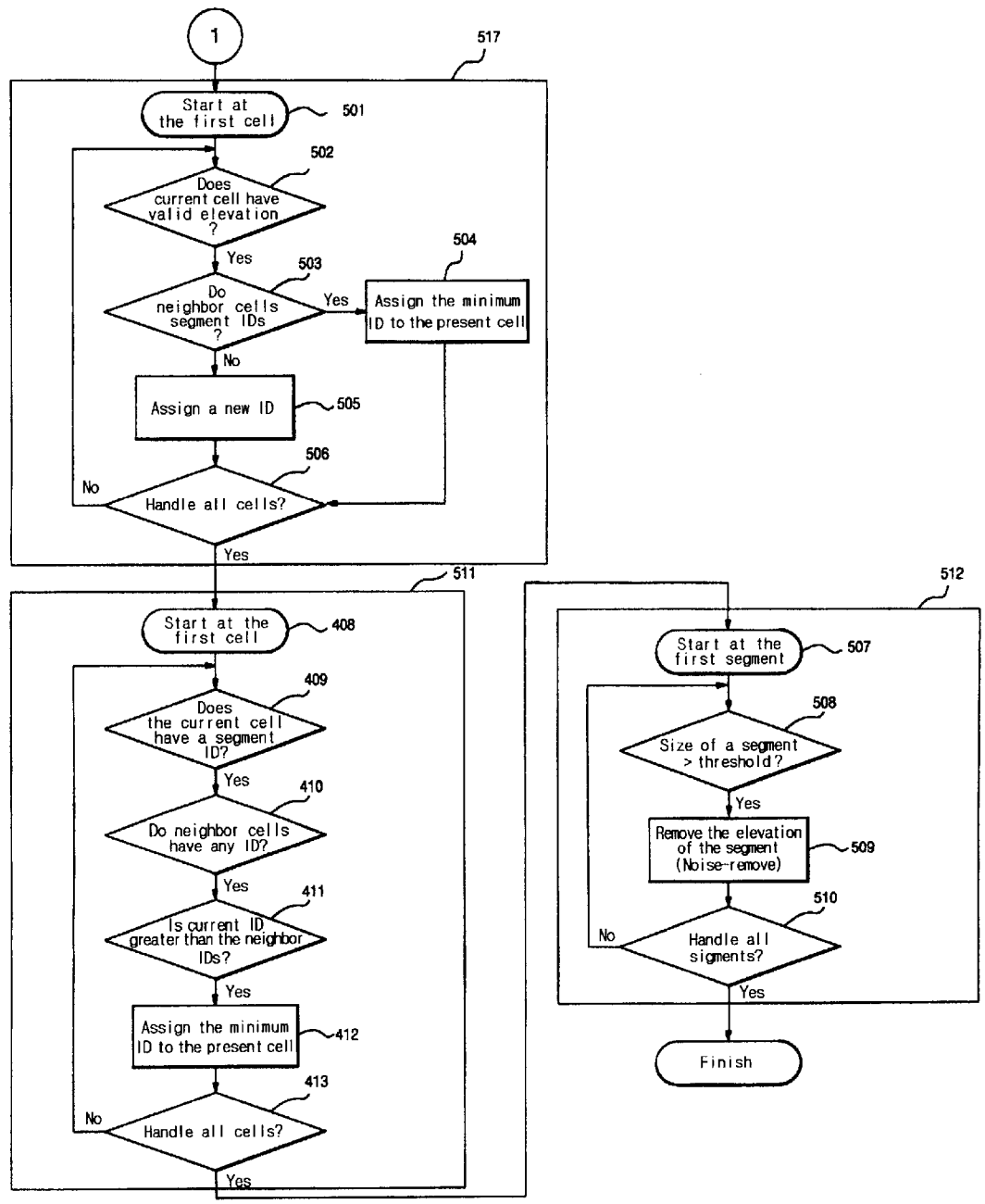
FIG. 7 is a flow chart for the noise-remove segmentation scheme of the present invention.

In the (A) step (517) of the third process (see FIG. 7), search neighboring grid cells when the current grid cell has an elevation. And assign (501–506) a segment ID to the current cell with the similar method to that in the (a) step (418) of the second process: Check if the current cell has an elevation (502). Here 4-connectivity scheme is used to connect the cells, and an island connected to the land with 8-connectivity scheme is regarded separate from the land. See (503) if the neighboring cells have a segment identification number (ID). Assign (504) the minimum value of segment IDs to the present cell if the neighboring cells have any ID. It is not necessary to choose the minimum value, and it is possible to choose a maximum value as long as this value is applied to the whole image. If no neighbor cells have an ID, assign a new ID—the largest ID so far plus one (505). Repeat the above processes from the top-left to the bottom-right and complete one scan (506).

In the (B) step (511) of the third process, merge fragmented segments by scans in four directions as described in the (b)-step of the second process. In the (C) step (512) of the third process, remove (509) the interpolated elevation of a merged segment if the size of the segment is smaller than a threshold (508). A user chooses the value of the threshold experimentally.

In the above mentioned processes (102, 103, 104), the first process (102) of the COG/ECI elimination is ahead of the second process of the hole-fill segmentation scheme and the third process of the noise-remove segmentation scheme. Hole-fill segmentation and noise-remove segmentation assist the COG/ECI elimination. In the first process, the order of the COG elimination and the ECI elimination is not important. However, it is advisable to apply the hole-fill segmentation first, and then apply the noise-remove segmentation. If this order is reversed, some elevation could be removed with the noise-remove segmentation, and it will be re-filled with hole-fill segmentation.

As mentioned above, the present invention can handle the elevation near a breakwater, a coast, and a river with open edges, and the invention provides the intelligent interpolation methods for automatic generation of an accurate digital elevation model. Therefore, the invention makes the DEM more useful in the field of disaster prevention and coastal simulation.

When the invention is introduced to a commercial software to produce a DEM off the coast, it can provide better results. The intellectual interpolation methods according to the invention require less than 5% of the calculating time compared to the CIMs and 100% additional computer memories. The cost of the memory is not so high, but the accuracy of interpolation is improved very much. These intelligent interpolation methods could be used with the CIMs, and applied to stereo-images with different horizontal resolutions, visible range images, and radar images.

What is claimed is:

1. An interpolation method for automatically generating a digital elevation model, which removes incorrect elevation outside stereo-matched regions, comprising the steps of;

the first process (102) where the interpolated elevation from the result (101) of an interpolation method is eliminated if the corresponding Center-of-Gravity (COG) or Empty-Center-Index (ECI) is greater than a threshold;

the second process (hole-fill segmentation, 104) where the eliminated region after the first process (102) is segmented, and it is determined whether the eliminated elevation should be reconstructed based upon the size of the segment; and the third process (noise-remove segmentation, 103) where the interpolated region after the first process (102) is selected, and it is determined whether the interpolated elevation should be eliminated based upon the size of the merged segment.

2. In the method as defined in claim 1, the ECI elimination method (102) wherein $x_o$, $y_o$ are horizontal coordinates, max-dist is the maximum of the distance between ($x_o$, $y_o$) and one of the interpolants, $r_k$ is the distance between ($x_o$, $y_o$) and an interpolant, unit grid size $\Delta r_{unit}$ is a constant to prevent $w_{eq}$ reaching singularity, $w_{eqECI}$ is a weighting factor to equalize the distribution of interpolants with respect to $r_k$, and $$w_{eq}(rk) = \Delta s^{-1} = [8\pi r_k \Delta r]^{-1}, s = 4\pi r_k^2 \qquad \text{(EQUATION 5)}$$

$$r_k = \sqrt{(x_k - x_o)^2 + (y_k - y_o)^2} + \Delta r_{unit} \text{ and,}$$

$$ECI = \frac{1}{\text{max-dist}} \cdot \frac{\sum_{k=1}^{N} r_k w_{eqECI}(r_k)}{\sum_{k=1}^{N} w_{eqECI}(r_k)}$$

3. In the method as defined in claim 1, the COG elimination method (102) wherein $w_{eqCOG}(x_k-x_o)$ is a weighting factor to equalize the distribution of interpolants with respect to ($x_k-x_o$), $\delta_{anti-sigu}$ is a constant to prevent $w_{eqCOG}$ reaching singularity, and $$w_{eqCOG}(x_k - x_o) = \frac{\cos(0) + \delta_{anti-sigu}}{\cos\left(\left(\frac{\pi}{2}\right) \cdot \frac{x_k - x_o}{\text{max-dist}}\right) + \delta_{anti-sigu}} \qquad \text{(EQUATION 6)}$$

$$COG = \frac{\sqrt{(\Delta x)^2 + (\Delta y)^2}}{\text{max-dist}},$$

$$\overline{\Delta x} = \frac{\sum_{k=1}^{N} (x_k - x_o) \cdot w_{eqCOG}(x_k - x_o)}{\sum_{k=1}^{N} w_{COG}(x_k - x_o)}, \text{ and,}$$

similarly for $\overline{\Delta y}$.

4. The method as defined in claim 1 wherein the second process (104) comprises of the following three steps:

the (a) step (418) which searches neighboring grid cells of no valid elevation when the current grid cell does not have valid elevation, assigns a segment identification number (ID) to the present cell if the neighboring empty cells have any segment ID, assign a new ID if no neighbor cells have an ID, repeats the above tasks from the top-left to the bottom-right, and completes one scan for the image segmentation;

the (b) step (419) which merges the fragmented segments by repeating the (a) step (418) starting from top-right, bottom-left, and bottom-right for each scan, and assigns a neighboring ID to the current cell when the current cell's ID is greater than the neighboring IDs; and the (c) step (420) which recovers the removed elevation of the merged segment if the size of the segment is smaller than a threshold, and leaves it as a hole when the segment is larger than the threshold.

5. The method as defined in claim 1 wherein the third process (103) comprises of the following three steps:

the (A) step (517) which search neighboring grid cells when the current grid cell has valid elevation, assigns a segment identification number (ID) to the present cell if the neighboring cells have any segment ID, assigns a new ID if no neighbor cells have an ID, repeats the above tasks from the top-left to the bottom-right and completes one scan for the image segmentation;

the (B) step (511) which merges the fragmented segments by repeating the (A) step (517) starting from top-right, bottom-left, and bottom-right for each scan, and assign a neighboring ID to the current cell when the current cell's ID is greater than the neighboring IDs; and the (C) step (512) which removes the interpolated elevation of the merged segment if the size of the segment is smaller than a threshold.

6. The method as defined in claim 5 wherein 4-connectivity scheme is used to connect the neighboring cells in the (A) step (517).

* * * * *